United States Patent Office 2,787,620
Patented Apr. 2, 1957

2,787,620
SALICYLIC ACID ESTERS

George Winfield Mast, South Salem, N. Y., assignor to Nepera Chemical Co., Inc., Yonkers, N. Y., a corporation of New York No Drawing. Application June 25, 1956,
Serial No. 593,373

8 Claims. (Cl. 260—345.8)

This invention relates to certain novel esters and relates more particularly to the salicylic acid esters of tetrahydropyranylmethyl alcohol having the formula

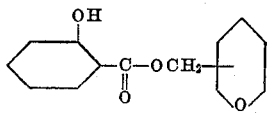

These esters are useful for their sunscreening action. They may be applied topically, for example, in a suitable base in the form of lotions, creams or solutions and may be readily compounded with petrolatum, or a mixture of petrolatum and lanolin to form a cream type formulation. The latter may contain from 2 to 35% by weight of the ester. The novel ester 2-tetrahydropyranylmethyl is particularly valuable as an effective sunscreening agent. It is highly absorbent in the skin-burning region of the ultra-violet and between the wave lengths of 2900 A., and 3200 A., it absorbs to an appreciably greater degree than other salicylates now accepted and recommended as effective sunscreen agents. For example, at all wave lengths between 2200 A. and 3500 A., 2-tetrahydropyranylmethyl salicylate has an absorption appreciably greater than the salicylic acid ester of dipropylene glycol, but without the percutaneous absorption observed with the latter.

A specific object of this invention is the provision of novel and odorless esters of salicylic acid which are safe and effective as sunscreening agents when applied to the skin but which are not absorbed into the blood stream.

Another important object of this invention is the provision of effective sunscreen agents which may be safely applied to the human skin in the form of lotions, creams or solutions and which protect the skin from the burning rays of the ultra-violet region without interfering with or reducing the action of the tanning rays.

Other objects of this invention will appear from the following detailed description.

The novel esters of my invention are obtained by reacting salicylic acid or salicylic acid chloride with 2-tetrahydropyranylmethyl alcohol or with either of the isomers 3-tetrahydropyranylmethyl alcohol or 4-tetrahydropyranylmethyl alcohol. Also, the novel esters of my invention may be obtained by a transesterification whereby methyl salicylate or other lower alkyl salicylate is reacted with a tetrahydropyranylmethyl alcohol, yielding methyl alcohol or other lower aliphatic alcohol as the byproduct. In order further to illustrate my invention but without being limited thereto, the following examples are given:

Example I 580 parts by weight of 2-tetrahydropyranylmethyl alcohol are mixed with 152 parts by weight of methyl salicylate and to the mixture are added 5.4 parts by weight of sodium methylate. The mixture is then refluxed at a temperature of 160–165° C. for 48 hours. The reaction mixture obtained is then fractionally distilled under vacuum and, after the unreacted 2-tetrahydropyranylmethyl alcohol is removed, 105.7 parts by weight of 2-tetrahydropyranylmethyl salicylate are distilled over at 163–165° C. under 1.0 mm. pressure. The liquid ester has an index of refraction $n_D^{27}=1.5278$. Analysis for $C_{13}H_{17}O_4$ is:

|  | Percent C | Percent H |
|---|---|---|
| Calculated | 66.08 | 6.83 |
| Found | 65.59 | 6.87 |

Example II 500 parts by weight of methyl salicylate are added to 1910 parts by weight of 2-tetrahydropyranylmethyl alcohol and 8 parts by weight of sodium methylate then added to the mixture. The temperature of the mixture is raised slowly without agitation and the sodium methylate gradually dissolved. The heating of the reaction mixture is continued and the byproduct methanol formed as the reaction proceeds is distilled over. The pressure in the reaction vessel is then lowered to about 1.0 mm. of mercury and the excess unreacted 2-tetrahydropyranylmethyl alcohol distilled over under this reduced pressure at a temperature of about 58–62° C. Distillation is continued at 0.5 mm. of mercury pressure and about 619 parts by weight of 2-tetrahydropyranylmethyl salicylate are distilled over under this pressure at a temperature of 125–128° C. The ester obtained has an index of refraction $n_D^{28}$ of 1.5295.

It is understood that the foregoing detailed description is given merely by way of illustration and that many variations may be made therein without departing from the spirit of my invention.

Having described my invention, what I desire to secure by Letters Patent is:

1. The salicylic acid esters of the formula

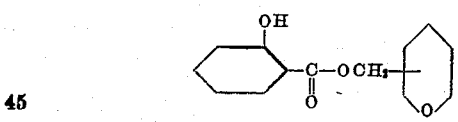

2. 2-tetrahydropyranylmethyl salicylate.
3. 3-tetrahydropyranylmethyl salicylate.
4. 4-tetrahydropyranylmethyl salicylate.
5. Process for the preparation of salicylic esters of the following formula

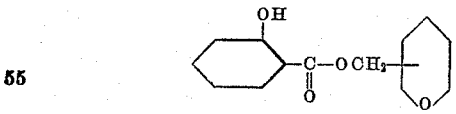

which comprises reacting a tetrahydropyranylmethyl alcohol with a member of the group consisting of salicylic acid and the ester-forming derivatives thereof.

6. Process for the preparation of 2-tetrahydropyranylmethyl salicylate, which comprises reacting 2-tetrahydropyranylmethyl alcohol with methyl salicylate.

7. Process for the preparation of 3-tetrahydropyranylmethyl salicylate, which comprises reacting 3-tetrahydropyranylmethyl alcohol with methyl salicylate.

8. Process for the preparation of 4-tetrahydropyranylmethyl salicylate, which comprises reacting 4-tetrahydropyranylmethyl alcohol with methyl salicylate.

No references cited.